United States Patent [19]

Vallomy

[11] Patent Number: 5,406,579
[45] Date of Patent: Apr. 11, 1995

[54] DYNAMIC SEAL

[75] Inventor: John A. Vallomy, Charlotte, N.C.

[73] Assignee: Consteel, S.A., Geneva, Switzerland

[21] Appl. No.: 86,817

[22] Filed: Jul. 2, 1993

Related U.S. Application Data

[63] Continuation-in-part of Ser. No. 959,733, Oct. 13, 1992.

[30] Foreign Application Priority Data

Dec. 21, 1992 [EP] European Pat. Off. ...... 92 121 658.9
Dec. 25, 1992 [JP] Japan ................... 4-346736

[51] Int. Cl.⁶ ............................................. F27B 14/04
[52] U.S. Cl. ........................................ 373/77; 373/79;
373/111; 432/8; 432/59; 110/205
[58] Field of Search ............... 373/8, 111, 9, 77, 79,
373/88, 123, 124; 75/10.63, 10.64, 46; 432/8–9,
59; 110/203–205; 241/247

[56] References Cited

U.S. PATENT DOCUMENTS

| | | | |
|---|---|---|---|
| 1,299,337 | 4/1919 | Hechenbleikner | 373/79 |
| 3,645,516 | 2/1972 | Turpin et al. | 432/17 |
| 3,841,465 | 10/1974 | Miller et al. | 241/247 |
| 4,285,668 | 8/1981 | Pepe | 432/19 |
| 4,543,124 | 9/1985 | Vallomy | 373/79 |
| 4,609,400 | 9/1986 | Vallomy | 75/10.63 |

Primary Examiner—Bruce A. Reynolds
Assistant Examiner—Tu Hoang
Attorney, Agent, or Firm—Ralph H. Dougherty

[57] ABSTRACT

A method and apparatus for limiting the passage of a gas such as air through an opening, particularly an opening through which solid material passes, by providing a sealing chamber in advance of the entrance to the low pressure chamber having a large plenum with a variable speed exhaust blower in its upper portion, and a grate situated in its lower portion for access of air to the plenum. The blower speed is responsive to differential pressure measurements taken in the low pressure chamber and immediately adjacent the exterior of the low pressure chamber. Upstream of the plenum are one or more mechanical seals or flexible baffles which contact the top of the solid charge material and ride over it as the solid material passes beneath the mechanical seal.

7 Claims, 4 Drawing Sheets

DYNAMIC SEAL

CROSS REFERENCE TO RELATED APPLICATION

This application is a continuation-in-part of my co-pending U.S. patent application Ser. No. 07/959,733, filed Oct. 13, 1992.

BACKGROUND OF THE INVENTION

This invention relates to a gas seal for preventing or limiting the passage of a gas through an opening, particularly an opening through which solid material also passes. The invention is particularly useful in the continuous preheating of charge materials such as iron-bearing scrap and direct reduced iron for continuous steelmaking in an associated electric arc furnace (EAF).

Continuous steelmaking is particularly advantageous in those regions where there is a concentration of production of, or ready availability of scrap and/or direct reduced iron (DRI), and where electric energy is both available and economical.

The introduction of ambient air to the interior of a chamber frequently places oxygen and/or nitrogen in undesirable contact with the material being heated or treated, resulting in the creation of chemical defects.

Unwanted compounds can be produced during continuous scrap preheating and feeding if the atmosphere within the preheater chamber is not carefully controlled. The present invention is a suitable means for providing such control, and to prevent the introduction of excess oxygen into the chamber.

Historically, the operation of an electric arc steelmaking furnace has been an intermittent operation, wherein the sequence followed is: charging of steel scrap and/or direct reduced iron, pig iron, slag formers and alloying elements; ignition or establishment of an electric arc between the electrodes in the furnace to create melting conditions for melting the charge and forming a molten metal bath covered by a molten slag; refining for a period of time during which the molten metal portion of the bath is refined to form steel having a desired composition and quality; and periodically raising the electrodes to remove them from contact with the bath and interference with the tapping procedure; and then tapping the molten metal. In addition, slag can be removed by a deslagging, or slag-off, operation as required.

The present invention is particularly well suited for use in the continuous steelmaking process described in my U.S. Pat. Nos. 4,543,124 and 4,609,400, which are incorporated herein by reference.

SUMMARY OF THE INVENTION

The present invention is a method and apparatus for limiting and controlling the amount of a gas entering a chamber having a lower pressure from a higher pressure area, particularly for limiting air intake in the continuous preheating of solid charge materials for the continuous refining of steel in an associated steelmaking furnace.

OBJECTS OF THE INVENTION

It is the principal object of this invention to provide a method and apparatus for limiting and controlling gas flow through an opening through which solid material in bulk also passes.

It is another object of this invention to provide an efficient sealing means for limiting or controlling the admission of outside air into a continuous charge preheater which utilizes off-gases from an associated steelmaking furnace to provide a portion of the heat required for preheating.

It is also an object of this invention to provide means for minimizing air or other gas intake into a low pressure chamber.

BRIEF DESCRIPTION OF THE DRAWINGS

The foregoing and other objects will become more readily apparent by reference to the following detailed description and the appended drawings, in which.

DETAILED DESCRIPTION

Figure 1:
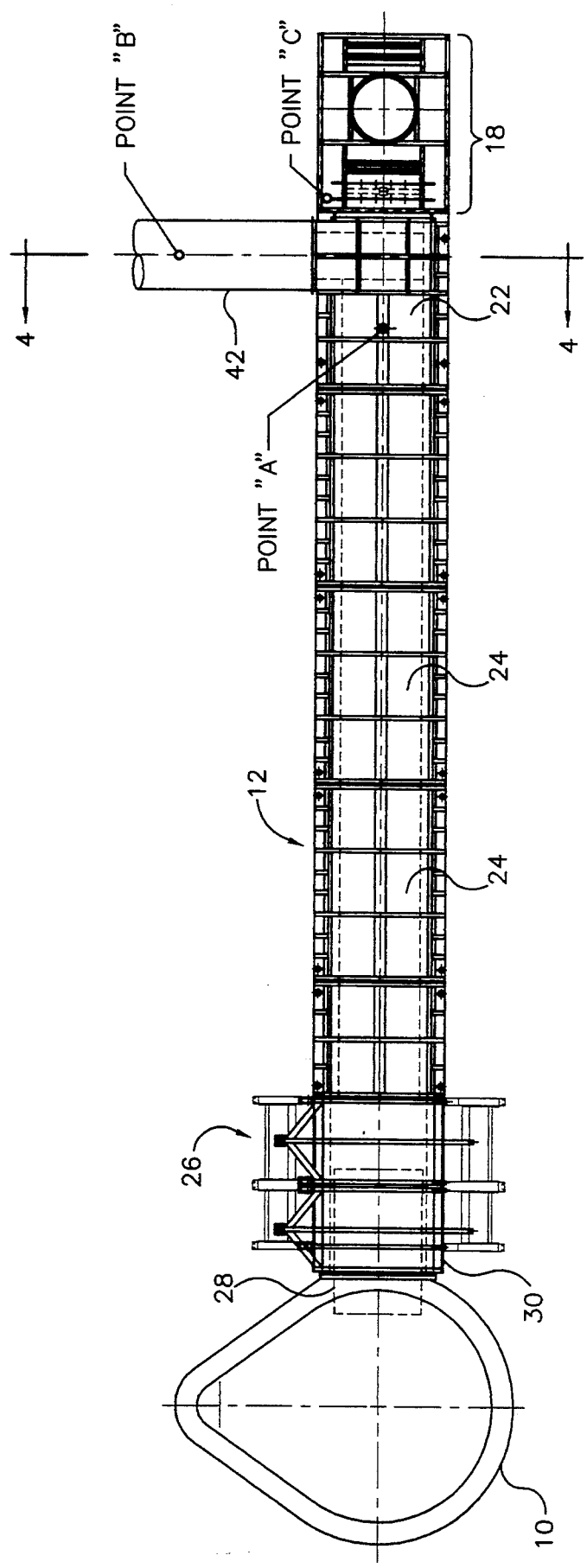
FIG. 1 is a schematic representation in plan view of an entire apparatus for preheating charge materials in a continuous steelmaking operation, utilizing the invented dynamic gas seal.

Referring now to the drawings, which illustrate a preferred embodiment of the invention in conjunction with a steelmaking process, an electric arc steelmaking furnace 10 has an associated elongated preheating chamber 12, such as a vibrating channel, for introducing charge materials, both metallics and nonmetallics, into the furnace. The furnace 10 can be a three-phase electric arc furnace, a direct current electric furnace, a plasma furnace or an induction furnace. The chamber 12 has an elongated support covered by a mating elongated hood, preferably refractory-lined, and generally in accordance with my U.S. Pat. No. 4,609,400, which is incorporated herein by reference. The heating chamber 12 has a dynamic seal 18 at the charge material entry end, and from the charge material entry end the heating chamber includes sequentially a gas transition section or zone 22, one or more heating sections or zones 24, and a material discharge section 26. Furnace 10 has an off-gas exit orifice 28. The discharge section of the chamber is mounted on a connecting car 30 for telescoping axial movement into engagement with the furnace opening 28 which effectively seals the stationary chamber 12 to the furnace 10, which may be a tiltable furnace. The connecting car feeds the scrap from the heater to the furnace at the proper location within the furnace. The connecting car is advantageously mounted on a track.

Furnace off-gas from furnace 10, the temperature of which is usually about 1300° C., enters the refractory lined scrap heating chamber 12 through material discharge opening 28. The furnace off-gas provides heat to the charge in the scrap heater chamber in two manners, by both the sensible and chemical heat contained in the furnace off-gas. Near the material discharge end of the heating chamber 12, a safety burner may be mounted for igniting combustible gases which have not reached the temperature of combustion. The safety burner is used only when the temperature within the heating zone 24 is below the flash point temperature of the furnace off gas.

Combustion air distribution is controlled to obtain even combustion throughout the preheating chamber. An oxygen sensor located in the gas transition section 22 of the elongated scrap preheating chamber 12 determines the amount of oxygen in the off-gas about to exit the chamber 12. This sensor controls the introduction of air through injectors mounted in the cover of the chamber to allow the operation to progressively change the atmosphere within the scrap heating chamber from reducing at the mixture discharge end to oxidizing in the gas transition zone; that is, first reducing in character to avoid reoxidation of the feed material, then the oxygen in the gas mixture is progressively increased to 3 to 5% excess oxygen, thus assuring that combustion of all combustible matter is complete within the scrap heating chamber. Since the air is injected evenly throughout the whole length of the heating zone 24 the atmosphere is changed gradually and evenly along the entire length of the heating chamber, with no dramatic change in any portion,, thus maintaining even distribution of combustion to preheat the scrap. Non-metallic combustible matter in the charge is burned off, and the charge is heated to at least 500° C., and to a maximum temperature of approximately 800° to 1000° C.

A small amount of air enters the gas transition zone 22 through the dynamic seal 18. The dynamic seal includes a sealing chamber 19 in advance of the entrance to the preheating chamber connected to the preheating chamber by a tunnel 17. The sealing chamber 19 has a large plenum 21 with a variable speed blower 35 powered by motor 37 in its upper portion. A grate 39 is situated in its lower portion for access of air to the plenum. Upstream of the plenum, are one or more mechanical seals 41, which may be flexible baffles or hinged curtains, and which contact the top of the charge material 50 and ride over it as it passes beneath the mechanical seal 41. A second mechanical seal 43 is located downstream of the plenum 21 for the purpose of imparting inertia to the system, and to dampen the change in differential pressure.

Further downstream, a mechanical shutoff seal mechanism 52 or damper having a seal member 58 may be provided to close the opening when no charge material is being fed into the scrap preheater chamber 12.

Means are provided for maintaining the pressure in the preheater at a lower pressure than that in the plenum. In addition, an even lower pressure is maintained at point B within secondary chamber 42.

The scrap charge enters the preheater chamber 12 on a conveyor 54 through dynamic gas seal 18. Preheater off-gas handling equipment is connected to the chamber 12 near and above gas seal 18. The hot off gas treating system includes an elongated refractory-lined secondary combustion chamber or thermal incinerator 42, a gas passageway connecting the incinerator to the chamber 12, a waste heat boiler or gas quenching unit, a bag house, and associated gas flow control means.

Figure 2:
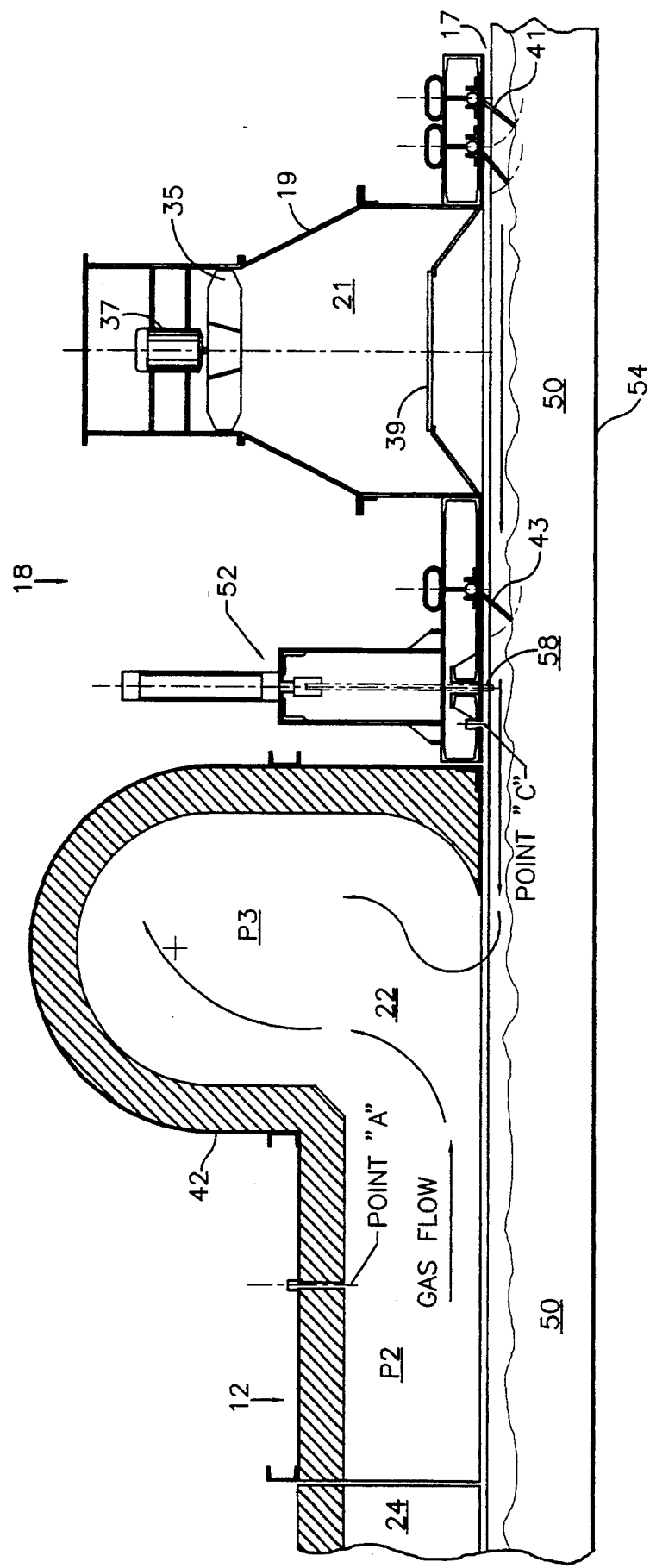
FIG. 2 is an elevational cross section of the invented apparatus, including the associated low pressure chamber.
Figure 3:
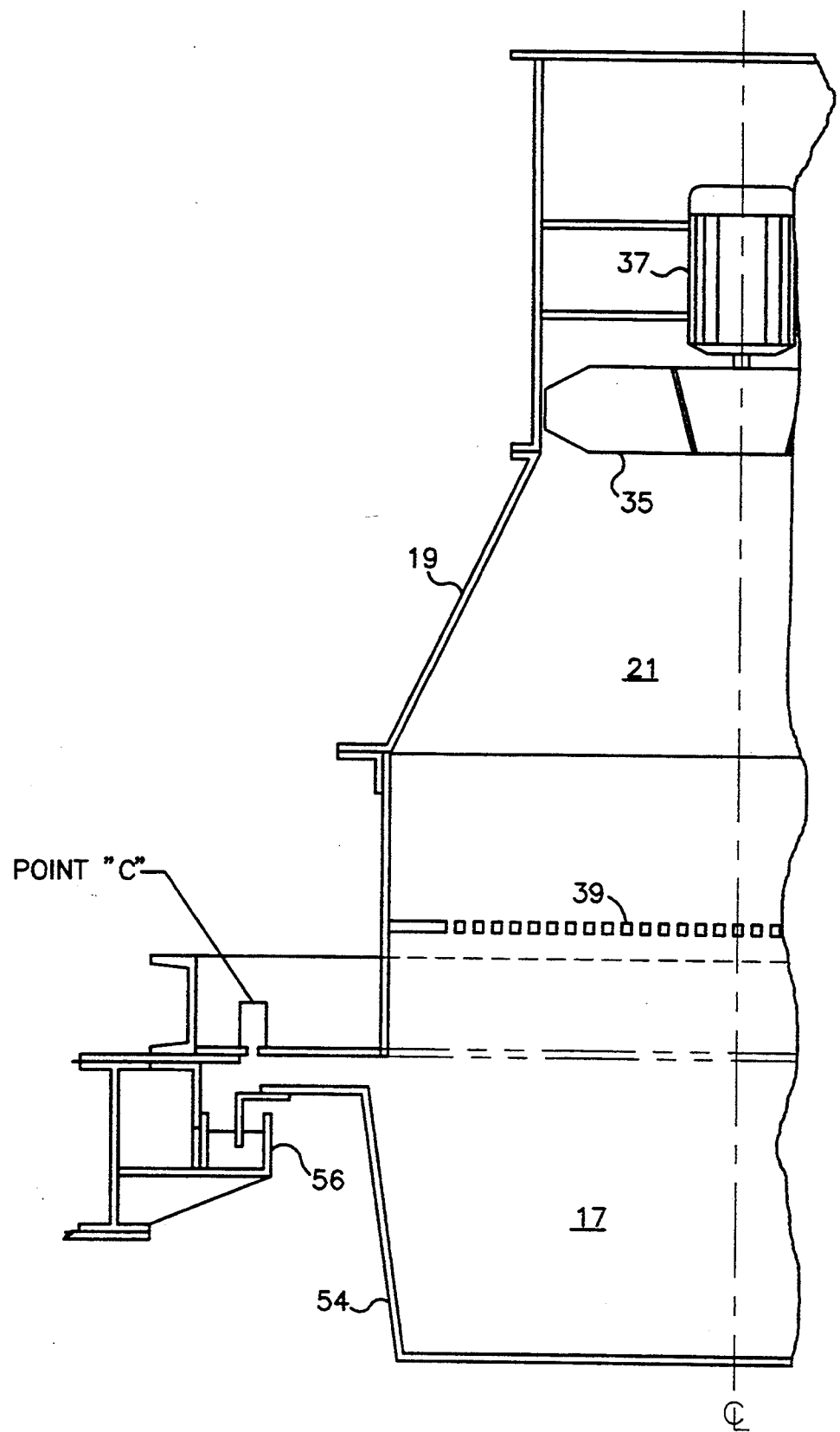
FIG. 3 is an enlarged vertical cross section of a portion of the apparatus of FIG. 2 according to the present invention at a right angle to the view of FIG. 2.
Figure 4:
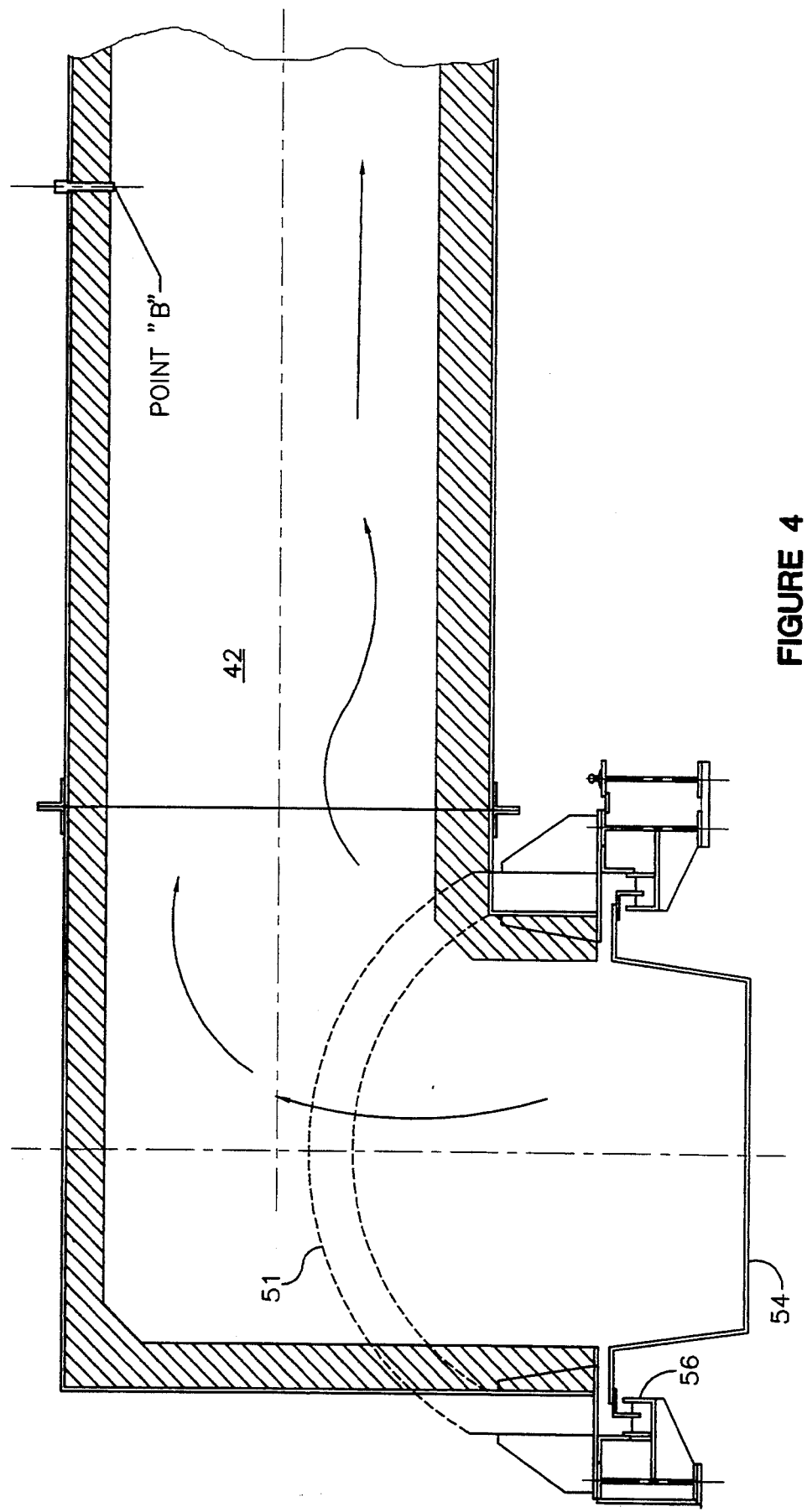
FIG. 4 is a vertical cross section view of a preheater chamber taken along line 4—4 of FIG. 1.

Referring now to FIGS. 2 and 3, vibrating channel 54 acts as the conveyor. The dynamic seal 18 at the material entry end of the conveyor is formed by a chamber 21 using air to prevent escape of flue gases from the scrap heating chamber to the atmosphere at that location by admitting a certain controlled low volume of air.

The term "scrap" as used throughout this specification and claims means charge material for continuous melting, including ferrous scrap, pig iron and direct reduced iron in pellet or briquet form. Scrap may be separated by grades of purity, shredded or sheared to suitable size, if necessary for continuous feeding into the furnace, and stored by grade until required for feeding.

Scrap defined as "commercial grade" by the Iron and Steel Scrap Institute (ISSI) is preferred. Pig iron is granulated or broken into appropriate size for feed stock.

Charge material is selected from the stored scrap material and other feed stock, weighed and fed onto the conveyor. The charge material is preheated in chamber 12, by passing furnace off-gas through and over it, counter-current to the flow of the charge into the furnace.

Control of the dynamic seal at the preheater scrap entry is carried out by pressure sensors which are connected to the control of the motor 39 of the variable speed blower. Two pressure sensors control the air seal, sensor A in the preheater chamber 22, and sensor C in the tunnel 17 at the scrap entrance to the preheater. The differential pressure across these two points controls the speed of the exhaust fan and in turn the static pressure at the entrance to the preheater. The pressure sensor B in the flue gas duct is located midway in a straight run of at least six pipe diameters in length. This pressure sensor is preferably located on top of the duct at a point where the gas flow is reasonably uniform.

Pressure sensor C at the entrance to the preheater is in a relatively quiet region away from excessive air disturbance. For this reason the sensor has been located above the water seal 56 about 300 mm downstream of the mechanical shutoff valve. The water seal is fully described in my U.S. Pat. No. 4,609,400.

A mechanical curtain 43 is provided in the tunnel 17 to reduce the effective opening between the top of the scrap charge 50 and the roof of the tunnel 17 and prevent preheater flue gases from escaping into the seal gas system. This curtain reduces the area of the opening by about 40% while the equipment is in full operation, and is flexible enough to maintain a minimum opening regardless of the height of the scrap charge.

Pressure sensor A determines the negative pressure in the preheater where the flue gas leaves the preheater to enter the secondary combustion chamber 42. The plan view of the preheater shows the relative locations of the pressure sensors A, B, and C with example calculated negative pressures at each position.

EXAMPLE

To prevent preheater flue gases from leaking into the exhaust flow system, the static pressure in the preheater inlet is set to about 5 mmwc greater (−15 mmwc) through the preheater. This setting is approximate and requires field testing to determine actual requirements.

The steelmaking furnace operates continuously at full power for an extended period of time up to approximately six or seven days during which time only minor lining repairs are made to the furnace. Slag in the furnace is kept in the foaming condition during all phases of the process, including the tapping phase, and full power is maintained to the furnace during tapping. Carbon and/or oxygen may be injected into the bath at any time. The carbon injection and the oxygen injection promote the formation of carbon monoxide. About 70 to 75% of the CO produced in the furnace passes out of the furnace into the scrap preheating chamber as fuel in the furnace off-gas.

In order to assure that all combustion of off-gas is completed upon its exit from the preheating chamber, it is necessary to have a residence time of 2.0 seconds at a temperature of 900°–1100° C. in the secondary combustion chamber. By providing excess oxygen of 3 to 5% in the incineration chamber with at least 2 seconds gas residence time at 900° to 1100° C., harmful emission levels of dioxins are incinerated.

In operation, iron-bearing material and other feed materials are mixed as desired, the mixture is continuously passed through a dynamic seal into an elongated heating chamber having sequentially a feed mixture entry end, a gas transition section, a heating section and a feed mixture discharge section. An associated electric arc steelmaking furnace which is fed by the mixture of feed materials generates carbon monoxide off-gas, which is removed into the heating chamber and combusted therein. The off-gas is generated by reaction of carbon in the bath (from feed materials and/or carbon injected into the bath with oxygen injected into the bath. The heat of combustion and the sensible heat of the furnace off-gas combined heat the chamber and the mixture therein by the hot off-gases passing through and over the mixture within the chamber. A progressively changing atmosphere is maintained within the heating chamber, from reducing at the mixture discharge end to oxidizing in the gas transition section. The products of combustion and associated off-gases are removed from the gas transition section of the chamber into an associated refractory-lined secondary gas-treating chamber communicating with the gas transition section. The temperature of the removed products of combustion and associated off-gases is maintained at a temperature in the range of 900° to 1100° C. for a period of at least 2 seconds in the secondary gas-treating chamber, then cooled and discharged. The heated feed mixture is discharged continuously and directly into the associated steelmaking furnace.

Air may be used to cool the conveyor during preheating to preheat the air for injection into the preheater, and to cool the portion of the conveyor in contact with the charge. The process utilizes the carbon monoxide generated from oxygen injection into the molten metal bath within the associated electric arc steelmaking furnace, or other available fuel, or a combination thereof, as the source of heat for scrap, preheating in the preheating chamber. The pre-heating chamber has an associated secondary gas-treating chamber at the material entry end to ensure thermal incineration of any residual combustible matter.

The present invention is also suitable for many other applications, such as municipal incinerators, where solid waste is introduced into a heated chamber through an opening, but where it is desirable to limit the admission air therethrough, in order to control the discharge of gaseous products of combustion into the atmosphere. The invention is generally useful in apparatus that performs simultaneous preheating of material while incinerating undesirable combustible matter.

SUMMARY OF THE ACHIEVEMENT OF THE OBJECTS OF THE INVENTION

From the foregoing, it is clear that I have invented a method and apparatus for the dynamic gas sealing of a chamber, which is particularly useful in continuous preheating of charge materials in conjunction with the operation of an electric steelmaking furnace, which allows continuous preheating of scrap materials and continuous or semi-continuous charging.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A dynamic gas seal apparatus for a low pressure treating chamber having an opening for introducing solids therethrough, comprising:
   a dynamic seal chamber adjacent said opening exterior to said treating chamber and a tunnel connecting said dynamic seal chamber and said treating chamber;
   variable speed blower means for creating a negative pressure in said tunnel; and
   means connected to the dynamic seal chamber for controlling an amount of gas entering said treating chamber from said dynamic seal chamber, comprising:
      means for measuring pressure at at least one location within said treating chamber and at one location external to said treating chamber between said treating chamber and said sealing chamber;
      means for determining the differential pressure between said locations; and
      means for controlling the speed of said blower responsive to said differential pressure;
      whereby said variable speed blower produces a predetermined negative pressure in the dynamic seal chamber, for controlling the amount of gas passing through the opening into said treating chamber.

2. A dynamic gas seal apparatus according to claim 1, wherein said gas is air.

3. A dynamic gas seal apparatus according to claim 1, further comprising conveyor means for conducting solid materials through said opening into said low pressure treating chamber.

4. A dynamic gas seal apparatus according to claim 3, further comprising a mechanical seal in said tunnel extending from said seal chamber toward said conveyor means.

5. In a method for the continuous preheating of charge materials for a steelmaking furnace, comprising:
   a) continuously passing a desired mixture of iron-bearing material and feed materials consisting essentially of ferrous scrap, pig iron and direct reduced iron through an elongated heating chamber having sequentially a feed mixture entry end, a gas transition section, a heating section and a feed mixture discharge end;
   b) establishing a dynamic seal at the feed mixture entry end of the heating chamber;
   c) heating the chamber and the mixture therein by passing hot gases through and over the mixture within the chamber, and combusting said gases to preheat the mixture and form products of combustion and associated off-gases;
   d) maintaining a changing atmosphere within the heating chamber from reducing at the mixture discharge end to oxidizing in the gas transition section;
   e) removing products of combustion and associated off-gases from the gas transition section of the chamber;
   f) maintaining the temperature of the removed products of combustion and associated off-gases at a temperature in the range of 900° to 1100° C. for a period of at least 2 seconds; and g) discharging heated feed mixture continuously and directly into a steelmaking furnace;

the improvement comprising maintaining the dynamic gas seal by:

creating negative pressure in an external seal chamber with a variable speed blower;

measuring pressure at at least one location within said heating chamber and at one location external to said heating chamber between said heating chamber and said sealing chamber;

determining the differential pressure between said locations;

controlling the speed of said blower in response to the pressure differential to maintain a predetermined pressure differential;

thereby controlling the amount of gas passing through the feed mixture entry end opening into said heating chamber.

6. Apparatus for the continuous preheating of charge materials for a steelmaking furnace, comprising:

a) conveyor means, having a charge material entry end and a material discharge end;

b) support means for said conveyor means;

c) a cover over a portion of said conveyor means, forming a heating chamber with said support means and having an opening at the entry end and at the discharge end, said heating chamber comprising sequentially a gas transition zone, a heating zone, and a feed mixture discharge zone;

d) gas seal means adjacent said material entry end of said conveyor means to the heating chamber, comprising;

1) a dynamic seal chamber adjacent said opening exterior to said heating chamber;

2) means for creating a negative pressure in said seal chamber; and 3) means for controlling an amount of gas entering the heating chamber from said dynamic seal chamber, comprising;

means for measuring pressure at at least one location within said heating chamber and at a location external to said heating chamber between said heating chamber and said sealing chamber;

means for determining the differential pressure between said locations;

means for controlling the speed of said blower responsive to said differential pressure;

whereby said variable speed blower produces a desired negative pressure in the dynamic seal chamber, for controlling an amount of gas passing through the opening into said heating chamber;

e) means for connecting and sealing the heating chamber to a steelmaking furnace;

f) means for introducing heat to the interior of said heating chamber;

g) means for removing off gases at the material entry end of said heating chamber; and h) means for heating removed off gases to a high temperature and for holding said temperature for a predetermined time.

7. Apparatus according to claim 6 wherein said conveyor means is a vibrating channel.

* * * * *